(12) United States Patent
Buchanan

(10) Patent No.: US 8,936,004 B1
(45) Date of Patent: Jan. 20, 2015

(54) ROTARY PISTON ENGINE

(75) Inventor: William Gregory Buchanan, King George, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 400 days.

(21) Appl. No.: 13/374,644

(22) Filed: Dec. 14, 2011

(51) Int. Cl.
| | | |
|---|---|---|
| *F02B 53/00* | (2006.01) | |
| *F02B 53/04* | (2006.01) | |
| *F02B 53/06* | (2006.01) | |
| *F01C 1/00* | (2006.01) | |
| *F03C 2/00* | (2006.01) | |
| *F04C 19/00* | (2006.01) | |
| *F01C 1/344* | (2006.01) | |
| *F02B 53/02* | (2006.01) | |
| *F01C 1/063* | (2006.01) | |
| *F01C 1/07* | (2006.01) | |
| *F04C 15/06* | (2006.01) | |
| *F04C 2/08* | (2006.01) | |
| *F02B 53/12* | (2006.01) | |

(52) U.S. Cl.
CPC .............. *F02B 53/00* (2013.01); *F01C 1/344* (2013.01); *F02B 53/02* (2013.01); *F01C 1/063* (2013.01); *F01C 1/07* (2013.01); *F04C 15/06* (2013.01); *F04C 2/084* (2013.01); *F02B 2730/01* (2013.01); *F02B 53/12* (2013.01); *F02B 2730/017* (2013.01); *F01C 1/3442* (2013.01); *F01C 1/3446* (2013.01); *Y02T 10/17* (2013.01)
USPC .............. 123/228; 123/240; 418/38; 418/183

(58) Field of Classification Search
CPC .......... F02B 53/00; F02B 53/02; F02B 53/12; F02B 2730/01; F02B 2730/017; F01C 1/063; F01C 1/07; F01C 1/344; F01C 1/3442; F01C 1/3446; F04C 15/06; F04C 2/084; Y02T 10/17
USPC ......... 123/228–229, 201, 233, 238, 240, 241, 123/245; 418/35–38, 183
See application file for complete search history.

(56) References Cited

U.S. PATENT DOCUMENTS

| | | | | |
|---|---|---|---|---|
| 979,638 | A * | 12/1910 | Ball ............................. | 123/201 |
| 1,106,882 | A * | 8/1914 | Mathiesen ................... | 418/183 |
| 1,637,958 | A * | 8/1927 | Newson ........................ | 123/229 |
| 2,289,342 | A * | 7/1942 | Canfield ....................... | 123/240 |
| 2,300,493 | A * | 11/1942 | George ......................... | 123/226 |
| 2,779,318 | A * | 1/1957 | Strader ......................... | 123/233 |
| 2,939,438 | A * | 6/1960 | Bush ............................. | 123/228 |
| 3,719,438 | A * | 3/1973 | Howard ........................ | 418/36 |
| 3,780,708 | A * | 12/1973 | Angsten ....................... | 123/229 |
| 3,867,912 | A * | 2/1975 | Parr et al. ..................... | 123/238 |
| 4,014,298 | A * | 3/1977 | Schulz .......................... | 123/229 |
| 4,086,881 | A * | 5/1978 | Rutten ........................... | 123/228 |

(Continued)

FOREIGN PATENT DOCUMENTS

GB          2262570 A * 6/1993 ............. F01C 21/06

*Primary Examiner* — Thai Ba Trieu
(74) *Attorney, Agent, or Firm* — Gerhard W. Thielman, Esq.

(57) ABSTRACT

A rotary piston engine is provided that combines most of the advantages of an internal combustion engine with those of a turbine engine. The rotary piston engine improves on the existing internal combustion and turbine technology by achieving the same or better high end performance, while improving the efficiency during off-peak operations. The rotary piston engine includes an engine housing, at least one continuous cylinder doughnut, piston pedals, movable wall valves, at least one rotor and at least one point of rotation.

14 Claims, 5 Drawing Sheets

(56) References Cited

U.S. PATENT DOCUMENTS

| | | | |
|---|---|---|---|
| 4,683,852 A * | 8/1987 | Kypreos-Pantazis | 123/228 |
| 6,210,135 B1 * | 4/2001 | Rassin et al. | 418/36 |
| 7,059,294 B2 * | 6/2006 | Wright | 123/238 |
| 7,182,061 B2 * | 2/2007 | Georgescu | 123/245 |
| 8,151,759 B2 * | 4/2012 | Wright | 123/228 |

* cited by examiner

| | ROTARY PISTON | TURBO-SHAFT | INDUSTRIAL PISTON | STANDARD PISTON | STANDARD PISTON |
|---|---|---|---|---|---|
| ENGINE: | | | | | |
| FUEL: | GASOLINE | JET FUEL | DIESEL | GASOLINE | DIESEL |
| CONFIG: | 8-CYLINDER (64-CYLINDER EQUIV.) | 10 STAGES | 16-CYLINDER | 8-CYLINDER | 8-CYLINDER |
| VOLUME: | 5.7 L | 323 L | N/A | 5.7 L (HEMI) | N/A |
| POWER: | 3060 hp | 1500 hp | 1325 hp | 380 hp | 368 hp |
| TORQUE: | 3200 lb-ft | N/A lb-ft | N/A lb-ft | 400 lb-ft | N/A |
| DIMENSION: | ø16"Dx9"W | ø23"Dx48"L | 104"Lx64"Wx66"H | 18"Lx13"Wx8"H | 48"Lx39"Wx51"H |
| WEIGHT: | 570 POUNDS | 545 POUNDS | 10,865 POUNDS | ~570 POUNDS | 2,345 POUNDS |
| RATIO: | >5.4:1 hp-wt | 1.7:1 hp-wt | 0.1:1 hp-wt | 0.7:1 hp-wt | 0.1:1 hp-wt |

FIG. 7

ROTARY PISTON ENGINE

STATEMENT OF GOVERNMENT INTEREST

The invention described was granted to the Department of the Navy by one employee of the Department of the Navy, and thus, the invention herein may be manufactured, used or licensed by or for the Government of the United States of America for US Governmental purposes only without the payment of any royalties thereon or therefore.

BACKGROUND

The invention relates primarily to combustion engines, and more particularly, to a high power density engine that is light weight, fuel efficient, and versatile.

There are many applications where a high power-to-weight engine is either necessary or helpful. Uses for this type of engine range from hand-held power equipment to motorcycles to racing boats to flying cars to aircraft. When you add fuel efficiency, compactness, and versatility the uses multiply. Currently, there are few viable options available to fulfill these applications and those that are available are very inefficient when high power is no longer desired. When the application warrants it, the engine type of choice has been the turbine engine.

Turbine engines are only efficient while high power is desired (heavy lift/movement and/or high speed), becoming very wasteful outside of their design load. Turbine engines are often un-economical due to their high manufacturing costs and poor fuel efficiency. Internal combustion engines are much more fuel efficient at off peak performance, but currently lack the power-to-weight ratio of turbine engines. Internal combustion engines use readily available fuel to drive them and are practical for many applications. Internal combustion engines are relatively economical to manufacture, reach peak power from idle relatively quickly, and have relatively low heat and noise signatures.

Diesel engines, in particular, while highly fuel efficient, are large and heavy. Take the M1 Abrams tank, for example. Currently, the smallest diesel with the power and speed to drive this main battle tank is significantly larger and heavier than a similarly powered turbine engine. In order to fit one in the chassis, something will have to be sacrificed, such as ammunition and fuel capacity, or the tank may need to be redesigned, such as a new suspension, new transmission, different final drives, and the like.

SUMMARY

Conventional internal combustion engines yield disadvantages addressed by various exemplary embodiments of the present invention. There is a need for a high power density engine that is light weight, fuel efficient, compact and versatile, which is addressed by various exemplary embodiments.

According to various exemplary embodiments, a rotary piston engine comprises at least one tows-shaped cylinder defined by an outer wall formed about an exterior circumferential surface of the tows and a rotor formed about an interior circumferential surface of the torus; at least one piston connected to the rotor; at least one compression tunnel for storing compressed gas; an intake port disposed through the outer wall for each wall valve; an exhaust port disposed through the outer wall for each wall valve; at least one wall valve mechanism disposed in the outer wall, each wall valve mechanism located between an intake port and an exhaust port; and an inflow port and an outflow port for each piston, each inflow port and outflow port adapted to fluidly communicate a cylinder with a compression tunnel.

According to further aspects of various exemplary embodiments, a method of connecting the rotor to a drive shaft with at least one spoke; and disposing a fuel port and a spark port between an intake port and the corresponding wall valve mechanism.

According to a further aspect of various exemplary embodiments, a method of rotating a driveshaft comprises opening an outflow port to direct compressed gas, stored in a compression tunnel, into a cylinder shaped as part of a tows; combusting gases in the cylinder, the cylinder having at least one piston disposed therein, where combustion gases push each piston about the tows and the piston is connected with at least one spoke to a driveshaft; closing the outflow port and opening an inflow port to direct gases on an advancing side of each piston into a compression tunnel; closing the inflow port to complete the first two strokes of the "modified Otto" cycle (tradename EPIC); and opening an exhaust port and an intake port, wherein the combustion gases are pushed out of the exhaust port and air (or air-fuel mixture) is taken in through the intake port during the second two strokes of the "modified Otto" cycle. Note that strokes of a rotary piston engine are not necessarily linear and generally comprise an arc, and generally begin and end at points of interaction between a piston and wall valve.

The above and other features of these embodiments relating to the invention, including various novel details of construction and combinations of parts, are more particularly described with reference to the accompanying drawings and pointed out in the claims. The particular assemblies are shown by way of illustration only and not as a limitation of the claims. The principles and features of this invention may be employed in various and numerous embodiments without departing from the scope of the invention.

BRIEF DESCRIPTION OF THE DRAWINGS

These and various other features and aspects of various exemplary embodiments will be readily understood with reference to the following detailed description taken in conjunction with the accompanying drawings, in which like or similar numbers are used throughout, and in which:

FIG. 7 is a tabular comparison of dimensions and performance between the rotary piston engine and conventional designs.

DETAILED DESCRIPTION

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the exemplary embodiments of the invention (used for the 'Detailed Description') is defined only by the appended claims.

In accordance with various embodiments, the components, process steps, and/or data structures incorporated therein may be implemented using various types of operating systems, computing platforms, computer programs, and/or general purpose machines. In addition, those of ordinary skill in the art will readily recognize that devices of a less general purpose nature, such as hardwired devices, or the like, may also be used without departing from the scope and spirit of the inventive concepts disclosed herewith. General purpose machines include devices that execute instruction code. A hardwired device may constitute an application specific integrated circuit (ASIC) or a field programmable gate array (FPGA) or other related component.

Broadly, the current invention provides a rotary piston engine that combines most of the advantages of an internal combustion engine with those of a turbine engine. The rotary piston engine improves on the existing internal combustion and turbine technology by achieving the same or better high end performance, while improving the efficiency during off-peak operations. As discussed in greater detail below, the rotary piston engine of the current invention includes an engine housing, at least one continuous cylinder doughnut, pistons (also called piston pedals), movable wall valves, at least one rotor and at least one drive shaft.

Figure 1:
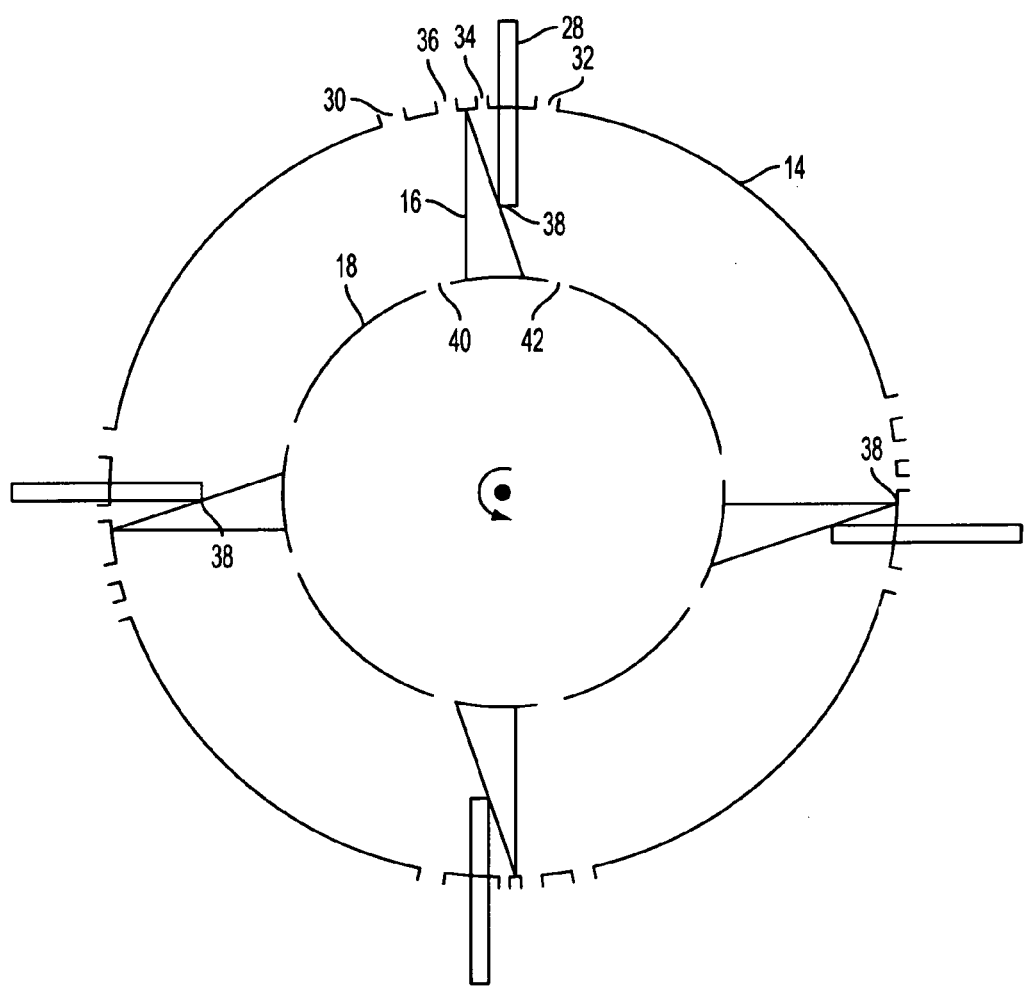
FIG. 1 is a cross-sectional plan view of a rotary piston engine according to an exemplary embodiment.
Figure 2:
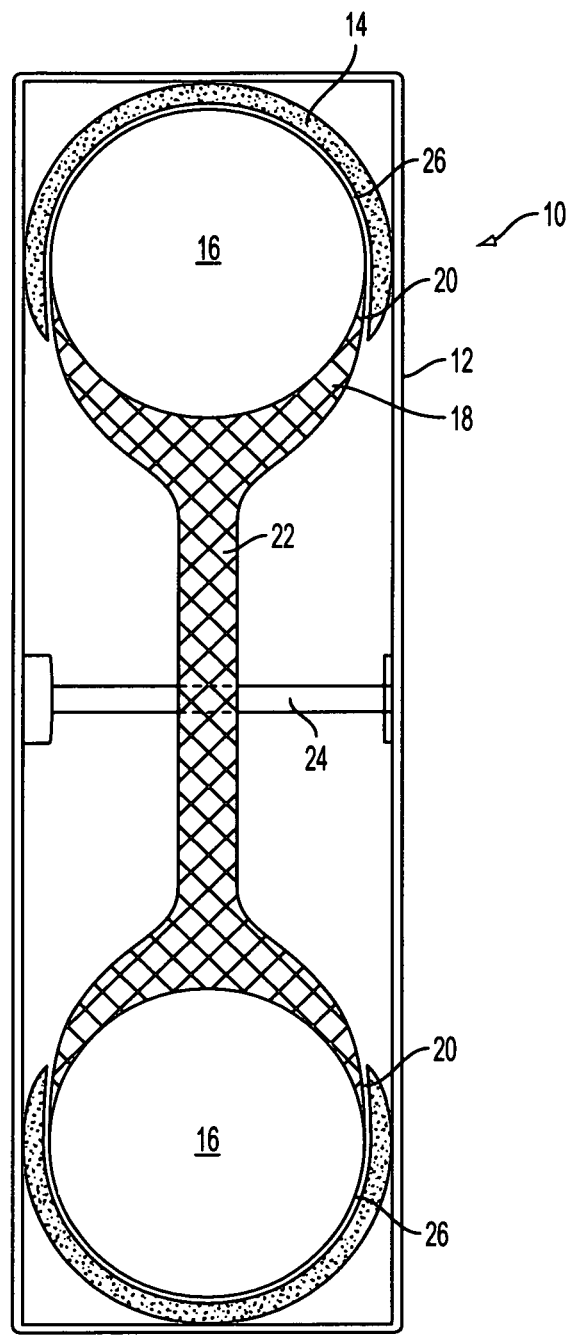
FIG. 2 is a cross-sectional elevation view of the rotary piston engine.
Figure 3:
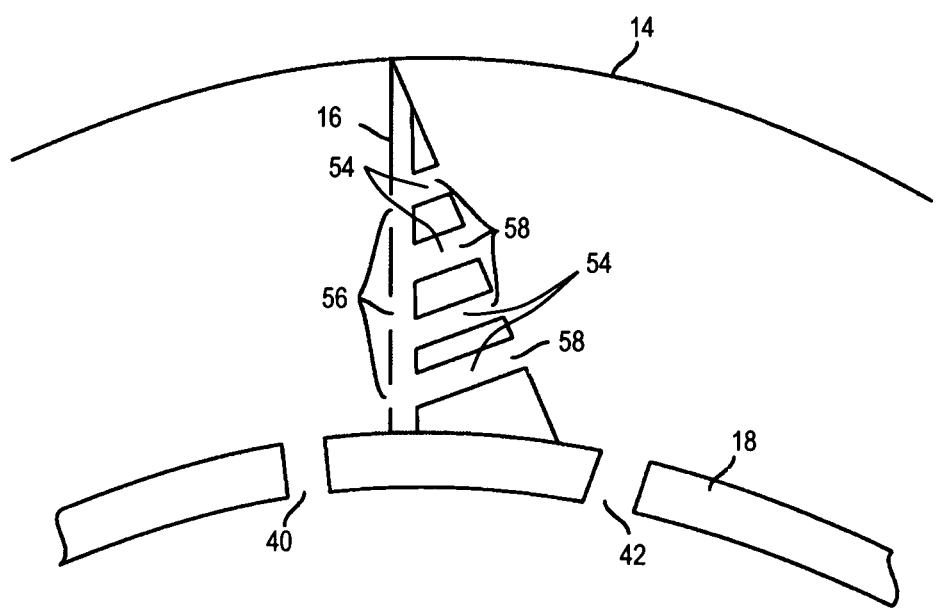
FIG. 3 is a close-up detail view of a piston of the rotary piston engine with the wall valve mechanism removed for clarity; with the compression tunnel(s) internal to the piston.

Referring to FIGS. 1 through 3, a rotary piston engine 10 may be a doughnut-shaped (i.e., toroidal) structure typically encased in a housing 12. A cylinder may be a C-shaped member defined by an outer wall 14 forming the exterior circumferential surface of the torus and a rotor 18 formed about an interior circumferential surface of the torus. One or more pistons 16 may rotate inside the outer wall 14. Each piston 16 is attached to a rotor 18, which in this embodiment is a solid rim with a flat (or concave) outer surface with a multiple spoke center, which may seal with outer wall 14 to form the inside diameter of the doughnut shape.

A seal 20 may be used to seal between the rotor 18 and outer wall 14. Spokes 22 may connect the rotor 18 with its pistons 16 to a drive shaft 24 disposed in the center opening of the doughnut-shaped rotary piston engine 10. A ring 26 may be disposed about each piston 16 to help seal the piston in the doughnut-shaped rotary piston engine 10. Similarly, another ring (not shown) may be disposed about each wall valve 28 for sealing in the doughnut-shaped rotary piston engine 10.

In an exemplary embodiment, a 5.7 liter, 8-cylinder (64-cylinder equivalent) rotary piston engine 10 may be designed as described below with reference to FIGS. 1 through 3. The sizes, configuration, number of pistons 16, and the like are for purposes of the current example and not meant to limit the scope of the present invention as defined by the appended claims.

The rotary piston engine 10 may be doughnut shaped with a Ø16" (inches) outside diameter and a Ø7" doughnut hole. The width of the doughnut may be 4.5" (the exemplary pistons 16 are Ø4.0" diameter×0.5" thick piston paddles, facing perpendicular to the planar surfaces of the doughnut). The inner rim of the doughnut hole is the circumference of the rotor 18 supporting the eight pistons 16 (constituting paddles) radially and equally spaced around off the top of it. The spokes 22 from the rotor 18 circumference join in the center of the doughnut hole, radially around the driveshaft 24 (which is perpendicular to the planar surfaces of the doughnut).

In this example, the engine core is Ø16"D×4.5"W with a hole in its center of Ø7"D×4.5"W (other than the rotor spokes 22 and driveshaft 24). Added to this are eight wall valves 28, an ambient intake port 30, an ambient exhaust port 32, a fuel port 34, and a spark port 36. The wall valves 28 can be placed radially around the circumference, increasing the overall diameter to Ø25" without increasing the width (as shown in FIGS. 1 and 3, for example). Another possibility is placing the wall valves 28 radially out the side of the doughnut, increasing the width to 9" without increasing the diameter. So the overall dimensions for the latter are Ø16" diameter×9" width, with a weight less than 570 pounds. These dimensions may optionally include engine components that support operational functions.

A plurality of seals 38 may be disposed at the distal ends of the pistons 16, where they meet the outer wall 14 (this seal may be the previously described ring 26 or some other sealing member), and at the proximate corners of the wall valves 28 to seal them against the piston 16 as shown in FIGS. 2 and 3 as well as to seal the wall valves 28 against the inside of the rotor 18 and outer wall 14.

Referring now to the drawings, the operation of the rotary piston engine 10 will be described. This operational description should be taken as only one example of the operation of the rotary piston engine 10, without limitation. Other operational parameters may be used, as can be recognized by those skilled in the art.

Figure 4:
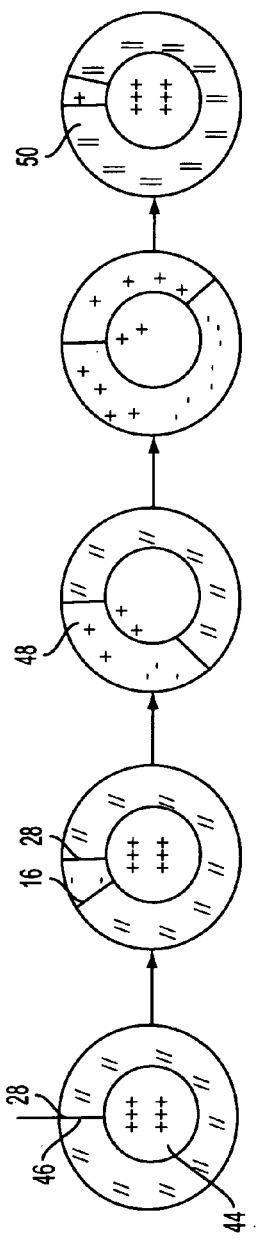
FIG. 4 is a cross-sectional views of the rotary piston engine during a first one of two revolutions.
Figure 5:
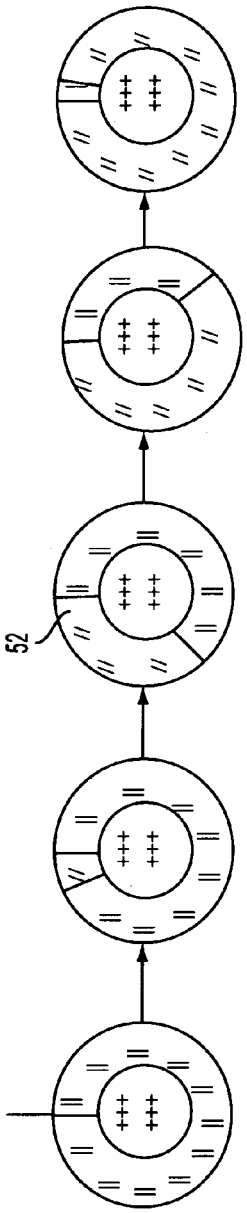
FIG. 5 shows cross-sectional views of the rotary piston engine during a second one of two revolutions.
Figure 6:
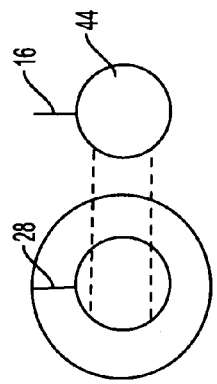
FIG. 6 is an exploded cross-sectional view of the rotary piston engine, exemplifying that the rotor and piston(s) may be an independent system from the outer wall and wall valve(s), including potential cooling paths.

The drawings in FIGS. 4 and 5 have been simplified, using only one piston 16 and one wall valve 28 (a one equivalent cylinder engine) to demonstrate the process. This process has been simplified for explanatory purposes. As the rotor 18 and piston 16 rotate around the driveshaft 24, they have to pass by the wall valve 28. The wall valve 28 retracts rapidly up into the engine housing 12 and out of the outer wall 14 to enable the piston 16 to pass under it. It then snaps back into the cylinder through the outer wall 14, sealing the wall valve 28 with the outer wall 14 and rotor 18 just as the piston 16 passes under it, such that the cylinder's cross section looks like a "C" shape (as opposed to a donut shape when the wall valve 28 is retracted up out of the cylinder) and gasses cannot pass around the wall valve 28.

The rotary piston engine 10 uses a "modified-Otto" cycle (tradename EPIC) such that the power and compression strokes occur simultaneously, followed by the simultaneous combination of the intake and exhaust strokes. In this example, the rotary piston engine's doughnut hole is sealed such that it stores the compressed air (only air for direct injection or air-fuel mixture for carburetor & manifold injection. Let 'air' represent either for this example) of the "modified-Otto" cycle and is referred to as a compression tunnel 44.

The compression tunnel 44 has an inflow port 40 just to the left of the piston 16 and an outflow port 42 just to the right of the piston, both porting through the rotor 18. There is also an intake port 30 just to the left of the wall valve 28 and an exhaust port 32 just to the right of the wall valve 28, both porting through the outer wall 14. A spark or glow plug (not shown) comes through the outer wall 14 just to the left of the wall valve 28 at the spark port 36. Note that the spark or glow plug may not be needed if pressure-induced combustion is operational.

For discussion purposes, let the initial state be such that the cylinder "C" shape is filled with uncompressed air and let the compression tunnel 44 be filled with compressed air. Let the rotor 18 spin counter clockwise around the "Y axis" (i.e., straight back into the page as shown in FIGS. 4 and 5), let the wall valve 28 move straight up and down along the "Z axis" (i.e., parallel to the short side of the page) at the top of the rotary piston engine 10. One revolution is represented by the time the piston 16 leaves the wall valve 28 until the time it returns again. In this example, one revolution covers two stokes of the "modified-Otto" cycle. The engine view of FIGS. 4 and 5 represents a cross sectional view.

Starting with the power/compression combination stroke (FIG. 4), as the piston 16 advances, the compressed air is released from the doughnut hole and ignited. The expanding hot gasses between the piston 16 and the wall valve 28 drive the piston 16 forward. An advancing side 46 of the piston begins to compress the air in the cylinder "C" shape. When the piston 16 is near the half-way point of the stroke, the compression tunnel outflow port 42 closes and the compression tunnel inflow port 40 opens. Now the air in front of the piston 16 compresses into the compression tunnel 44 as the piston 16 is pushed from behind by the expanding combustion gasses 48.

As the piston 16 nears the wall valve 28, the compression tunnel inflow port 40 closes, locking the compressed air inside the compression tunnel 44. The wall valve 28 immediately retracts out of the cylinder, enabling the piston 16 to pass under it (the advancing side 46 of the piston 16 is now touching exhaust 50 left by the stroke that has just occurred) and then the wall valve 28 immediately snaps shut behind the piston 16. The pressurized air is stored in the compression tunnel 44 for the full intake/exhaust combination stroke that follows.

At this point, referring to FIG. 5, the intake port 30 opens behind the piston 16 and the exhaust port 32 opens at the other end of the "C" shape on the advancing side 46 of the piston 16. The piston 16 proceeds forward, sucking in air 52 and pushing out exhaust gasses 50 (left by the proceeding stroke). As the piston 16 approaches the wall valve 28 again, the intake port 30 and exhaust port 32 begin to close, leaving a cylinder full of air behind the piston 16 and empty of exhaust gasses in front of the piston 16.

The wall valve 28 immediately retracts out of the cylinder, enabling the piston 16 to pass under it (the advancing side 46 of the piston 16 is now touching the air 52 that was taken in by the stroke that has just occurred) and then immediately snaps shut behind it. At the completion of the intake/exhaust strokes, the compressed air that was previously stored in the compression tunnel 44 is available to start the power/compression combination stroke. Now the process repeats itself.

The above example is equivalent to a conventional single cylinder engine in which there is only one power stroke for every two revolutions. By adding another wall valve midway in the torus shaped cylinder, the engine is converted into a two equivalent cylinder engine. This allows one power stroke per rotor revolution (just as a conventional 2-stroke engine has one power stroke per crank shaft revolution). If another piston is added symmetrically to the rotor, the engine becomes a four equivalent cylinder engine, with two power strokes for every revolution.

Four wall valves and four pistons is equivalent to a 16-cylinder engine (or similarly eight pistons and two wall valves). The multiplication factor continues with eight wall valves and eight pistons equating to a 64-cylinder engine, even though there are physically only eight distinct cylinders, as sectioned off by the eight wall valves. This engine would produce 32 power strokes per rotor revolution (versus four power strokes per crank shaft revolution in a conventional eight-cylinder engine).

This phenomenon is possible because each piston shares the same space as the previous piston, sequentially and each piston accomplishes two strokes of the four 'Otto' strokes, simultaneously, A revolution may contain zero to multiple strokes, completing zero to multiple cycles.

Power (combustion, etc.) is applied perpendicular to the moment arm (rotor spoke) throughout the entire stroke, supplying maximum leverage throughout a power stroke. A conventional piston engine's piston rod (lessened even more by the angle between the piston rod and the piston's parallel movement along the cylinder) is only perpendicular to its moment arm (crankshaft lobe) at one moment in time during its power stroke, and that likely never coincides with the point of maximum combustion power.

Power may be routed in any direction or orientation.

A rotor(s) (or outer cylinder wall) never has to change its motion for the purpose of completing the four strokes of the Otto cycle (or diesel or any other cycle or process). This allows for the conservation of momentum. A conventional piston engine's pistons must each stop, change direction, and accelerate twice to complete the four stokes of the Otto cycle.

Alluding to a cycle, such as the Otto cycle, does not exclude the invention's incorporation of other cycles and processes (particularly the diesel cycle). In fact the invention includes all applicable cycles and processes (including non-cyclic, mixed cycles, combinations, etc.), regardless of the number of strokes, combustion process(s) (e.g., Isentropic expansion, constant pressure, other), fuel/energy type (electromagnetic, electrical, thermodynamic, fluid dynamic, other dynamics, quantum, relativistic, magnetic, heat, pressure, state change, mechanical, organic and/or inorganic chemical composition, element, biological composition, molecular/atomic construct, or combination; even types not requiring air 'oxygen' intake, compression, and/or exhaust), fuel state (e.g., gaseous, liquid, solid, or combination), ignition/energy release and trigger (e.g., electromagnetic, electrical, thermodynamic, fluid dynamic, other dynamics, quantum, relativistic, magnetic, spark, flame, heat, pressure, state change, mechanical, biological, chemical, physical, statistical, electronic, indicator, time, command, signal, sequence/pattern, reaction, proximity, temperature, speed, change in speed, gravity, combination, or other), lack of combustion (e.g., Steam, compressed air, etc.), or other.

Individual equivalent cylinders can be turned off at will and turned back on almost instantly. Since the compressed air (or fuel/air mixture) is stored, one simply does not open the outflow port after a piston passes a wall valve and waits to release it until that piston passes a different wall valve further down line. This delay could be for a portion of a revolution up to thousands of revolutions.

Any number of equivalent cylinders may be shut off (from 1 to 64 for the 64-equivalent cylinder example) for variable and independent time periods, to match the instantaneous power demand (or other reasons). There may be practical limits or combinations that must be observed. Thus, a cycle or process may change progressively, sequentially, randomly, etc. in different portion(s) or for an entire operation.

Any process(es), along with its timing/sequencing with and use of other items may be varied and more complex than the simplified process(es) described herein. A process(es) may be based on time, sequence, cycle, pattern, portions, ingredients, method(s), programming, code, equation (s), condition(s), physical characteristic(s), scientific principles or phenomena (physics, chemistry, biology, physical sciences), natural laws, engineering logic, random, other process(es), combination(s), etc.

Various embodiments include the potential utilization of an odd (or even) number of pistons and/or wall valves. The number of pistons does not need to match the number of wall valves.

Placement of any engine item(s) throughout or external to the engine(s) may or may not be symmetrical.

Movement in and out of a cylinder may or may not be limited to the wall valve(s). A piston(s) may also move to allow passage under a wall valve or to temporarily reduce the number of pistons in the engine. Similarly, the wall valve(s) could be stationary and only the piston(s) move in and out of a cylinder or both a wall valve(s) and piston(s) may move.

A wall valve(s) (and/or piston(s)) may stay retracted for portions of or many revolutions to increase the physical stroke length (gas expansion path) of an equivalent cylinder, rest, vary the firing sequence of the engine, etc.

Other items may move in, within, out, and/or around the cylinder with similar or different characteristics to that of pistons.

Piston(s) may switch positions with the wall valve(s), such that the piston extends from the outer cylinder wall and the wall valve extends from the rotor rim (or any other positions).

Torus cylinders may be stacked inside of each other (an example may be similar to the nestling of a Matryoshka doll. In one such embodiment, the outer cylinder wall of one torus cylinder may become the inner cylinder wall of next torus cylinder, and vice-versa Alternatively, torus cylinders may be stacked abreast (i.e., side-by-side). In one such embodiment, the outer cylinder wall of one torus cylinder may be shared by the next torus cylinder, and vice-versa. Also, combinations of the nestling and abreast configurations are possible, as well as tandem (i.e., one-behind-the-other) arrangements.

Movement in, within, and out of a cylinder by piston(s) and/or wall valve(s) may be perpendicular, angled, linear, non-linear, complex, rotary, hinged, gated, flapped, slid, etc. such that they translate, rotate, swing, slide, roll, float, slip, fluid dynamically, spiral, other, or combination. Movement of piston(s) and/or wall valve(s) may be in part(s) or in whole such that individual pieces (or groups of pieces) may move in simple or complex relative motion to each other and/or other engine item(s).

Piston(s) may or may not be connected physically or in any other way to the engine or other.

A cross section of each piston(s) or wall valve(s) in part(s) or in whole, perpendicular to the length of its cylinder, will generally match the shape of the cylinder cross section. The piston(s) shape does not need to match that of the wall valve(s).

Each piston(s) face, in part(s) or in whole, perpendicular to the length of its cylinder, will combine proportions of the shape of each wall valve (the inverse of the shape of the portion of each wall valve's shape that comes in contact with each piston), the parallel and perpendicular cross sections of itself (i.e., piston), and any other alteration in shape. Each piston face may be partially or fully open to the passage of substance through it for a time, multiple times, or continually.

Each piston(s) and/or wall valve(s) may move in, within, or out of any other engine item(s) or engine(s).

Each wall valve face may be partially or fully open to the passage of substance through it for a time, multiple times, or continually. Each wall valve face will combine proportions of the shape of perpendicular and parallel cross sections of itself (i.e., wall valve), and any other alteration in shape.

Each rotor may rotate around or on a shaft (or other interior feature), rotate inside the outer wall of the cylinder, or it may remain stationary. Similarly, the engine housing (or outer wall) may be stationary; it may rotate around the rotor, or rotate inside an exterior feature. Either may move in simple or complex relative motion to each other and/or other engine parts (e.g., translate, rotate, swing, slide, roll, float, slip, fluid dynamically, spiral, other, or in combination.

Each rotor spoke(s) can be tensile only, compressive only, a combination, segmented, continuous, in parts, of any number, planner, non-planner and spatial. Rotor spokes may be absent completely, a void in the entire (or partial) center of the rotor (or rotors).

Any engine item(s) used internal or external to a engine(s) may be housed in, routed around, through, between, shared, or in combination with any engine item(s), internal or external to the engine(s). Engine item(s) includes part, portion, component, interfaces, system, assembly, engine housing, accessory, tubing, piping, wiring, network, belt, chain, cooling system, fuel system, ignition system, command & control system, monitoring system, intake and exhaust system, cylinder, outer wall, wall valve, piston, rotor, rotor rim, rotor interior, spoke, shaft, flow path, port, valve, ignition/release, trigger, etc., multiples of, or combinations.

A part (or parts) is a piece of any size (nano, micro, macro, etc.) including connector, electronic, electromagnetic, mechanical, chemical, biological, other, multiples, or combination. Any engine item(s) core may be hollow, porous, filled with other/mix of materials or mechanisms or structures, hollow to solid, continuous length item, segmented, liquid, gaseous, semi-solid, solid, etc. or combination of any size and shape. Any core may allow passage or be part of a flow path.

Any engine item(s) may be in any orientation to other engine item(s), be any shape or size, connected or not, pliable or not, permeable or not, continuous or not, of any texture, have any scientific property(s), of any material(s), of any function(s), etc., or combinations. Any engine item(s) may change any parameter(s) along its own or another engine item(s) dimension(s), in relation to time, or in relation to process. Each engine item has a surface or surfaces, each surface has a texture or textures, etc. A dimension(s) is any face, side, length, width, height, depth, breadth, angle, cross section, view, etc., combination. Orientation is any or multiple angles including perpendicular, parallel, etc. Shape(s) includes thin, fat, long, short, round, elliptical, rectangular, triangular, octagonal, multi-faceted, v-w, symmetrical, non-symmetrical, concave, convex, curvy, sinusoidal, wavy, jointed, spiral, coiled, twisted, multi-angled, grooved, straight, radial, riffled, airfoil, any other geometry or shape or partial shape, or combination(s).

Any engine item(s) with respect to any other engine item(s) in the same engine or other engines may act independently, sequentially, coordinated, patterned, etc. Flow path includes gaseous, liquid, semi-solid, solid, part(s), electromagnetic, electricity, data, heat, wave, propagation, mechanical, electrical, chemical, biological, thermal, etc. movement (includes compression tunnel, port as a passageway, wire, tubing, heat sink, etc.).

Combustion may be initiated and/or sustained from/inside/through any engine item(s), internal or external to the engine(s). A reduced volumetric space between and while a piston and wall valve are in contact allows a smaller quantity of combustible material to be released through the outer portion of either; while maintaining adequate to enhanced conditions for combustion. Combustion source location(s), along with control of mix, quantity, and timing may aid the combustion process for power, efficiency, smoothness (avoid detonation or one large explosion), and flame speed. Sustained combustion from the piston(s) (or Wall Valve or other) may allow reactive forces to further propel the piston forward.

Compressed gas may be accumulated and stored in engine item(s), internal or external to the engine(s). All or only a portion of the stored compressed gas may be released in any given power stroke (with or without combustion). In the power and compression combination stroke, compression may end before or after the completion of power expansion. Similarly, in the intake and exhaust combination stroke, exhaust may end before or after the completion of intake. Gas in front of each piston (in the power/compression stroke) may be compressed for combustion in a future stroke, the next stroke, within the same stroke, or in an extended stroke. These combustion alterations may aid in propulsion of the piston(s). Intake and exhaust stroke(s) may be by other means.

Multiple rotors may share a cylinder (or engine) or vice-versa. Rotor(s) or cylinder(s) may be in one or multiple parts. Wall valves or pistons may be shared by multiple rotors, cylinders, and/or engines. A rotor (or cylinder) may move relative to one or multiple drive shafts or other feature(s).

Each port in part(s) or in whole may manipulate flow (or other) with a valve(s) or through other means. Each port may or may not have supporting parts for manipulating flow (or other). Each port may manipulate flow in one or multiple directions. Each port may connect, transfer, carry, convert, mate, route, mix, sense, inspect, control, dock, be an opening(s), gateway(s), point(s), passageway(s), other, or combination(s). Each port (or its mechanism(s), e.g., valve) may work with gas, liquid, semi-solid, solid, part(s), data, electromagnetic, mechanical, electrical, biological, chemical, thermal substances or energy. A valve may translate, rotate, swing, slide, roll, float, slip, fluid dynamically, spiral, other, or in combination to control access (or for other operations.

Ignition source(s) is not limited to spark or glow plugs, heat and compression, or combination, but also include any other energy source for ignition (electromagnetic, electrical, thermodynamic, fluid dynamic, other dynamics, quantum, relativistic, magnetic, spark, flame, heat, pressure, wave, sound, optical, state change, mechanical, chemical, biological, physical, combination, or change of).

Liquid (e.g., fuel), semi-solid (e.g., plastic, particles, other), energy, and/or gaseous (e.g., Air) flow introduction or mixing is not limited to that discussed herein and may be modified (e.g., enhance combustion, improve efficiency, aid cooling, decrease wear, etc.). The formulation of liquid, semi-solid, energy, and/or gases may be modified by altering the timing, state(s), ratio(s), and/or process(es) for the addition or subtraction of substances through external and/or internal mean(s).

Any material, process, or engine item(s) can be utilized in construction, operation, support, etc. of any engine item(s) for various embodiments. Materials, processes, or engine item(s) may be electromagnetic, electrical, thermodynamic, fluid dynamic, other dynamics, quantum, relativistic, magnetic, spark, flame, heat, pressure, state change, mechanical, electronic, chemical, biological, physical, statistical, organic and/or inorganic chemical composition, element, biological composition, molecular/atomic construct, or combination in any state (e.g., gaseous, liquid, solid, or combination), or of any size (macro, micro, nano, atomic, subatomic)/shape/makeup.

Control, operation, or support of materials, processes, or engine item(s) may be electromagnetic, electrical, thermodynamic, fluid dynamic, other dynamics, quantum, relativistic, magnetic, heat, temperature, pressure, wave, sound, thought, movement, position, state change, optical, mechanical, actuation, electronic, chemical, biological, physical, natural laws, statistical, combination, change of, or other. Sensor(s) of any type or function may be utilized anywhere throughout or external to the invention. It may be tied into any material, process, or engine item(s). Any material, process, or engine item(s) may be controlled passively, actively, not at all, or combination.

Electronic(s) includes hardware, software, data (database(s), data source(s), data transmission/reception, data conversion, etc.), wired networks, wireless networks, or combinations (e.g., Firmware, EPROMs, middleware, operating environment, etc.). This includes computers, devices, interfaces, systems, components, parts (e.g., transistor, circuit board, sensors, user interface, feedback, processor, router, switch, nano device, etc.), combination, or other of any size/shape/makeup and performing any function(s).

Interior, makeup, or exterior of any engine item(s) may be modified (or added to or subtracted from) to change the invention's dynamics (e.g., aero, hydro, molecular, particulate, thermo, system, etc.).

Connection (connect, connects, connections, connector, connected, contact, etc.) includes fastener, mount, joint, seal, ring, gasket, slide, bearing, sleeve, spring, dampener, isolator, shock, ball, swivel, rocker, rotary, port, interlock, lock, fluid, gas, particles, chemical bond (or mechanical, electromagnetic, biological, etc.), held by pressure (or friction, suction, interlock, knot, inertia, dynamics, screw, etc.), tensile material (or compressive, torsion, bending, stretching, flexible, other), other, combinations.

Interior, makeup, or exterior of engine item(s) may be modified (or added to or subtracted from) to change the invention's mass, dampening, spring, materials, combinations, other for balance, shock, vibe, flutter, bending, twisting, expansion or contraction, stress, strain, moment, wear, combinations, or other mitigations.

Texture may be wavy, spiral, coiled, multi-faceted, multi-angled, grooved, pitted, smooth, rough, grainy, finned, dimpled, etc. or combination thereof.

Any enhancement(s) or accessory(s), external or internal, made to other engine types may be applicable to various embodiments. Naming of any engine item(s) herein does not preclude the use of any other naming under this invention. Best practices and lessons learned from all Science & Technology (including Engineering and Trades for research, development, technology and engineering (RDT&E), Manufacturing, Operations, Support, Disposal) and supporting fields may be employed for the inventions entire Life Cycle. Any item listed herein applies to the entire Life Cycle of the invention as appropriate, including RDT&E, Manufacturing, Operations, Support, and Disposal.

In various alternate embodiments, the pistons 16 may be shaped to aid movement of the wall valve 28 (acceleration followed by deceleration). A triangular shape is shown in FIGS. 1 and 3, but sinusoidal and other shapes may be used. Because the pistons 16 are thicker in these embodiments, an alternate compression tunnel 54 may be formed inside each piston, decreasing losses. This may be achieved by forming inflow ports 56 and outflow ports 58 onto the piston 16 as shown in FIG. 3. Also, the spark plug can be installed into the wall valve 28 for gasoline engines (not required for diesel versions).

The rotary piston engine 10 of the current invention can be used for any commercial application where a high power-to-weight ratio engine is desired. This is especially true where fuel economy and/or compact size are also appreciated (decreasing operating costs or improving business with increased operational range or payload). Some industries that may benefit from exemplary embodiments include shipping, trucking, trains, air carriers (turboprop), rotorcraft, automotive, boating, flying, construction and farming.

As discussed above, the rotary piston engine 10 of the current invention offers a high power-to-weight ratio compared to conventional designs. A performance comparison is shown in FIG. 7 as a tabular listing. In particular, the exemplary rotary piston is compared to turbo shaft, industrial piston, and standard piston engines (the last comparing both Diesel and gasoline fuel types).

In various embodiments, cylinders can be turned on and off in less than two engine revolutions, with no losses, to adjust to power needs while maximizing fuel economy. The rotary piston engine of the current invention can be scaled down for hand-held power equipment or scaled up to power a ship, it can be short and fat, or long and skinny. The engine's center doughnut hole diameter can be much larger or smaller than the piston diameter (to adjust stroke length, moment arm, or to make room for other systems in the center), and it can have one to unlimited equivalent cylinders.

The rotors can be stacked to increase power density, to run counter-rotating shafts, or as a built-in back-up engine (each rotor can have entirely independent systems). The engine's rotor could be fixed such that the engines housing moves around it (e.g., a self propelled tire). The engine's center is essentially hollow, a doughnut hole or a torus, that could house systems including electrical coils (a built in hybrid motor or generator), a water impellor propulsion or liquid pump, a solids (or semi-solids) mover, ducted fan propulsion, a completely hollow tube for pass through, a completely solid or semi-solid center, and the like.

The invention's outer section (eg. Doughnut) may be wrapped or coated, partially or in whole, with wire, tubing, insulation, sheeting, coating, or other to produce a mechanical, electromagnetic, or other effect(s).

Internal cylinders may be used to move other fluids (liquid, gases, semi-solid) if driven externally or may be powered by other than a fuel-air mixture.

Spinning section(s) of the engine (e.g., Rotor) can energize itself via rotational and centrifugal forces, inertia, heat, etc. These energy sources would allow hydraulics, mechanical movement, natural flow, and the generation of electricity or magnetism for example. The generated energy could also be shared with the stationary engine section(s).

Embodiments of the engine (or portions thereof) may be unwound from around and/or stretched out longitudinally along the y axis (running into the page for FIG. 1) spirally, curved, straightened, other geometry, or some combination thereof. This may be such that movement of a portion(s) of the engine is translated longitudinally (may be in combination with rotational, vertical, and/or lateral movement) in a spiral curvature. The stretched out portion(s) may be parts of the engine housing (e.g., outer wall), cylinder, engine core (e.g., Rotor), combination, and/or other. The stretched out portions may also be stacked (similar to that of stacking the torus cylinders), consistent with any attributes described herein.

Engine (or portion thereof) may rotate around, move along any axis (or combination of), or move relative to any other portion(s) of the engine(s), including the y axis as demonstrated previously.

Engine start may not require a flywheel. Also, an electric starter may not be required if pre-stored compressed gas (internal or external to the engine) is used for initiation.

Wall valve (or piston) movement may utilize electromagnetic, hydraulic, pneumatic, chemical, mechanical, or other forces. Similarly, the spinning item(s) of the engine may utilize the same forces for breaking, transferring energy, or locking to another engine item(s) for a time.

'The wall valve' 28 denotes a component that extends radially inward between the outer wall 14 and the rotor 18 to engage the pistons 16, or withdraws into the outer wall 14. Any reference to 'torus' also refers to 'doughnut' equally (as appropriate).

In some embodiments of the invention, a cooling cycle may be periodically performed in and around engine items impacted by heat.

It will be understood that many additional changes in the details, materials, steps and arrangement of parts, which have been herein described and illustrated in order to explain the nature of the invention, may be made by those skilled in the art within the principle and scope of the invention as expressed in the appended claims.

The foregoing description of the preferred embodiments of the invention has been presented for purposes of illustration and description only. It is not intended to be exhaustive nor to limit the invention to the precise form disclosed; and obviously many modifications and variations are possible in light of the above teaching. Such modifications and variations that may be apparent to a person skilled in the art are intended to be included within the scope of this invention as defined by the accompanying claims (or as described above).

What is claimed is:

1. A rotary piston engine, comprising:
   at least one torus-shaped cylinder defined by an outer wall formed about an exterior circumferential surface of the torus and a rotor formed about an interior circumferential surface of the torus, said rotor rotating within said cylinder;
   at least one piston that connects to said rotor;
   a compression tunnel disposed in said at least one piston for storing compressed gas from within said cylinder;
   at least one wall valve disposed in the outer wall;
   intake and exhaust ports disposed through the outer wall and positioned circumferentially fore and aft of said at least one wall valve, wherein said intake port receives ambient air, and said exhaust port releases exhaust gases;
   an inflow port and an outflow port within said at least one piston, said inflow and outflow ports adapted to fluidly communicate with said compression tunnel;
   a driveshaft that turns axially in response to said rotor; and
   at least one spoke that radially connects said rotor to said driveshaft.

2. The rotary piston engine of claim 1, further comprising: at least one spoke connecting said rotor to said driveshaft.

3. The rotary piston engine of claim 1, further comprising a spark port disposed between each intake port and corresponding said wall valve.

4. The rotary piston engine of claim 1, further comprising a fuel port disposed between each intake port and the corresponding wall valve.

5. The rotary piston engine of claim 1, wherein the compression tunnel is located is a central region of the torus.

6. The rotary piston engine of claim 1, further comprising a seal disposed between the rotor and the outer wall.

7. The rotary piston engine of claim 1, wherein the rotary piston engine includes multiple pistons.

8. The rotary piston engine of claim 1, further comprising a seal adapted to seal each wall valve mechanism to an edge of each piston, the cylinder, and to the rotor.

9. The rotary piston engine of claim 1, further comprising a ring adapted to seal each piston to the outer wall.

10. The rotary piston engine of claim 1, further comprising a spark port formed in one side of each wall valve.

11. The rotary piston engine of claim 1, wherein each piston has a triangular cross-sectional shape.

12. A method for operating a rotary piston engine having a driveshaft, the method comprising:

connecting the driveshaft radially to a rotor that rotates within a cylinder shaped as a torus;

connecting at least one piston to said rotor, said at least one piston having a compression tunnel;

receiving, storing and compressing gas by said compression tunnel from said cylinder;

opening an outflow port to direct compressed gas, stored in said compression tunnel, into said cylinder;

combusting gases in said cylinder having at least one piston disposed therein and connected to said rotor, wherein combustion gases push said at least one piston about said cylinder;

closing the outflow port and opening an inflow port to direct gases on an advancing side of said at least one piston into said compression tunnel;

closing the inflow port to complete first strokes for said at least one piston; and opening an exhaust port and an intake port, wherein the combustion gases are pushed out of the exhaust port and air-fuel mixture is taken in through the intake port during second strokes for said at least one piston.

13. The method for operating a rotary piston engine of claim 12, wherein the intake port and the exhaust port are formed in the outer wall of said cylinder.

14. The method for operating a rotary piston engine of claim 12, wherein each inflow port and each outflow port are located in the rotor and the compression tunnel is formed in a central region of the torus.

\* \* \* \* \*